United States Patent [19]

Evans et al.

[11] Patent Number: 4,713,130

[45] Date of Patent: Dec. 15, 1987

[54] TUFTING PROCESS AND APPARATUS FOR MANUFACTURING WEATHERSTRIPPING

[75] Inventors: Robert D. Evans, Weston, Conn.; Robert C. Blezard, Harrissville, R.I.

[73] Assignee: Amesbury Industries, Inc., Amesbury, Mass.

[21] Appl. No.: 640,667

[22] Filed: Aug. 14, 1984

[51] Int. Cl.[4] .................... B32B 5/00

[52] U.S. Cl. .................... 156/72; 112/266.2; 112/80.3; 112/80.31; 112/80.32; 112/80.4; 156/435; 428/85; 428/92; 428/95

[58] Field of Search .................... 112/79 R, 266.2, 794; 428/85, 92, 95; 156/72, 435

[56] References Cited

U.S. PATENT DOCUMENTS

| | | | |
|---|---|---|---|
| 3,175,256 | 3/1965 | Horton | 20/69 |
| 3,404,487 | 10/1968 | Johnson | 49/475 |
| 3,616,137 | 10/1971 | Horton | 428/95 |
| 3,745,053 | 7/1973 | Johnson et al. | 428/85 |
| 4,164,599 | 8/1979 | Kessler | 428/92 |
| 4,288,482 | 9/1981 | Beck | 428/92 |
| 4,548,849 | 10/1985 | Garnett | 428/92 |

*Primary Examiner*—Marion C. McCamish
*Attorney, Agent, or Firm*—Cesari and McKenna

[57] ABSTRACT

Weatherstripping is produced continuously by two or more spaced apart tufting heads, which may be operating at different stitch rates. The or each strip of weatherstripping comprises at least two rows of tufts sequentially inserted by two tufting heads. Heated dies may be located between the tufting heads for transforming rows of tufts inserted by the first tufting head at least partially into film to form barrier fins. The knuckles of the tufts are flattened, a secondary backing applied, and then individual strips of weatherstripping separated by ultrasonically slitting, all as a continuous process enabling weatherstripping of various constructions to be efficiently and economically produced by tufting.

8 Claims, 19 Drawing Figures

TUFTING PROCESS AND APPARATUS FOR MANUFACTURING WEATHERSTRIPPING

FIELD OF THE INVENTION

This invention relates to pile weatherstripping and the manufacture thereof by tufting, and includes the manufacture of pile weatherstripping having a barrier fin.

BACKGROUND OF THE INVENTION

Weatherstripping in the form of a strip of substrate having one or more rows of pile upstanding therefrom is well known, and employed to mitigate the ingress of air, moisture and water through the clearance between a door or window and the surrounding frame structure on which the latter is mounted and movable relative to during opening and closing. It is also known to incorporate a barrier fin in such weatherstripping, either between two rows of pile or on one or both sides of the pile, see for example U.S. Pat. Nos. 3,175,256; 3,404,487; and 3,745,053.

Such weatherstripping has commercially generally been produced by weaving the substrate and cutting the woven substrate to cause rows of pile to upstand therefrom. Thereafter, a backing layer is applied to the underside of the substrate. However, it has been mentioned that pile weatherstripping might be produced by tufting, see for example U.S. Pat. No. 3,404,487 referred to above.

The weatherstripping is usually made by forming a plurality of rows, or groups of rows, of pile on the substrate, and then slitting the substrate to produce individual strips, see for example U.S. Pat. No. 4,288,482.

However, known methods of producing weatherstripping have shortcomings such as speed of production, economics of production, and lack of versatility to readily produce products to different specifications. Further, when barrier fins are employed, it is usually necessary to separately form the barrier fin and then as an additional manufacutering step incorporate the barrier fin into the pile product.

SUMMARY OF THE INVENTION

Although to date pile weatherstripping has not been manufactured commercially to Applicant's knowledge by tufting, Applicants have conceived that it could be more efficient and economical to produce weatherstripping by tufting than by weaving.

It is an object, therefore, of the present invention to provide an improved method and apparatus for producing weatherstripping by tufting.

A feature by which this object is achieved is the employment of at least two tufting positions, one spaced downstream from the other. This provides the advantage that at least two rows of tufts can be placed very closely together, one row being inserted at one tufting position and then the other row being inserted at the other tufting position. This is particularly beneficial when it is desired to produce weatherstripping in which a center row is required between two outside rows and the distance between the center row and each outside row is less than can be produced with a tufter of normal commercial gauge. This also has the further advantage that if the rows are inserted by different tufting heads the rows can readily be so inserted at different stitch rates, different pile heights, and/or different pile construction, thus enabling a wide range of weatherstripping constructions to be readily produced, some of these constructions not previously being possible.

It is a further object of the present invention to provide a method and apparatus for producing by tufting weatherstripping having a barrier fin.

A feature by which this is achieved is the incorporation between two tufting heads of heated dies for transforming the rows of tufts inserted by the first tufting head at least partially into films. This has the advantage that a barrier fin can be produced as part of a continuous tufting process, with the second tufting head subsequently inserting one or more rows of tufts alongside the barrier fin. Not only can these subsequently inserted rows be close to the barrier fin, but their subsequent insertion leaves sufficient room for the formation of the barrier fin in their absence.

Accordingly, therefore, there is provided by one aspect of the present invention a method of manufacturing weatherstripping comprising sequentially tufting first and second rows of tufts into a primary backing at first and second spaced apart tufting positions. Preferably, the second tufting position inserts twice as many rows of tufts as the first tufting position, placing a row on each side or every row inserted by the first tufting position.

Advantageously, when producing weatherstripping having a barrier fin, rows of tufts inserted by a first tufting station are transformed at least partially into films at a location between two spaced apart tufting stations. These films are securely attached to the primary backing by the tufts from which they are made passing through the primary backing and being connected together on the reverse side thereof by the tuft "knuckles". In addition these films may be further attached to the primary backing by deforming the knuckles into a ribbon firmly adhered to the primary backing and/or the use of tuft locking material such as an adhesive, or an extruded polymer, etc.

According to another aspect of the present invention there if provided a tufting apparatus for producing weatherstripping, comprising a first tufting head having at least one needle, and a second tufting head having at least one needle, this second tufting head being spaced downstream apart from and in general alignment with the first tufting head but with the needles of the two tufting heads being slightly displaced to one side of each other. Means is provided for operating the first tufting head at a first stitch rate and the second tufting head at a second stitch rate, these rates being different or the same. Means is provided for moving primary backing past the first and second tufting heads sequentially. Preferably, the operating means includes adjustable means for adjusting the second stitch rate relative to the first stitch rate.

Preferably, the second tufting head has a needleplate with grooves or slots therein to accommodate passage therethrough of the row of tufts inserted by the first tufting head, this row of tufts then either being in the form of pile or a film.

The apparatus may have more than two such spaced apart tufting heads, for example, a third tufting head with a grooved needleplate may be spaced apart downstream from the second tufting head, the or each needle of the third tufting head being slightly displaced with respect to the respective needles of the first and second tufting heads.

According to the invention there is also provided a tufted weatherstripping product comprising a strip of primary backing, at least two rows of tufts inserted through the primary backing along the length thereof, and the two rows having a different number of tufts per unit length of the strip. One of the rows may have at least partially been transformed into a film.

Other objects, features and advantages of the present invention will become more fully apparent from the following detailed description of the preferred embodiments, the appended claims and the accompanying drawings.

DETAILED DESCRIPTION OF THE PREFERRED EMBODIMENTS

Figure 1:
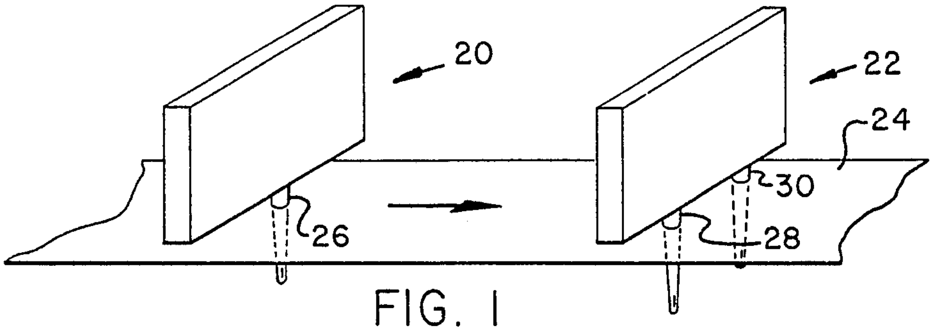
FIG. 1 is a schematic perspective view illustrating the tufting concept of the present invention.

FIG. 1 schematically illustrates the broad concept of the present invention and shows a first tufting head 20 with a second tufting head 22 spaced downstream therefrom. A strip 24 of substrate, or primary backing, is drawn from left to right in FIG. 1 past the first tufting head 20 and then past the second tufting head 22. The tufting head 20 has a single needle 26, and the tufting head 22 has a pair of tufting needles 28, 30 disposed to tuft on each side of the needle 26. In operation, the needle 26 inserts a first row of tufts in the substrate 24, this row of tufts then passing between the needles 28, 30 which insert two further rows of tufts in the substrate 24 one on each side of the row inserted by the needle 26. In this way, a weatherstripping product is produced made from three adjacent rows of tufts.

The tufting heads 20 and 22 can be independently adjusted so that the pile height of the row of tufts inserted by the needle 26 is the same as or different from the pile height of the rows of tufts inserted by the needles 28 and 30. Also, the stitch rate of the needle 26 can be arranged to be the same as, less than, or greater than the stitch rate of the needles 28, 30. Further, the rows of tufts produced by the three needles 26, 28 and 30 can be all loop pile, or all cut pile, or can be a combination of cut pile and loop pile. For example, the tufting head 20 can be arranged to produce looped pile, while the tufting head 22 is arranged to produce cut pile, or vice versa. Moreover, the denier and/or type of yarn tufted by the first tufting head 20 may be different from that tufted by the second tufting head 22. In this way, as will be appreciated, a wide of variety of weatherstripping products tailored to individual specific requirements can readily be produced. Due to the row of tufts produced by the needle 26 passing between the rows of tufts produced by the needles 28, 30, it is possible to arrange the three rows of tufts very closely together, more closely than has hithertofore been possible with existing tufting machines. Further, this arrangement enables a center row of tufts to be formed to a completely different construction than the outer rows in a single pass through the tufting machine of the present invention. Also, when it is desired to make weatherstripping from only two rows of pile, then both tufting heads 20 and 22 need only have single needles, the needle of one tufting head being offset with respect to the needle of the other tufting head.

One embodiment of a tufting machine for producing weatherstripping in accordance with the invention will now be described with reference to FIGS. 2 to 7.

Figure 2:
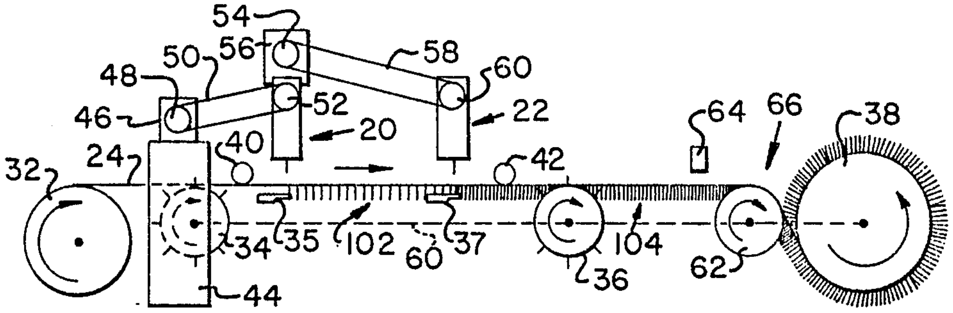
FIG. 2 is a diagrammatic elevational view of a tufting machine according to and for carrying out the present invention.

FIG. 2 shows a diagrammatic elevational view of the tufting machine in which the substrate 24 is drawn from a freely mounted supply roll 32 by a driven spiked roll 34. The substrate then moving past the first tufting head 20 above the needleplate 35 thereof, past the second tufting head 22 above the needleplate 37 thereof, and is then forwarded by driven spiked roll 36 to a take-up roll 38 upon which the tufted substrate is wound. An electric motor drive unit 44, disposed between the supply roll 32 and the first tufting head 20, drives the first tufting head 20 through a variable gear box 46, pulley 48, timing belt 50, and pulley 52. A second variable bear box 56 is mounted on the first tufting head 20, the pulley 52 also being the input to the gear box 56. An output pulley 54 of the gear box 56 drives the second tufting had 22 via a timing belt 58 and timing pulley 60. The motor drive unit 44 also drives the downstream driven rolls 34, 36, and 38 through a drive train 60 shown schematically by a broken line. Idler rolls 40, 42 associated with the driven spiked rolls 34, 36, respectively, maintain the underside of the substrate 24 in contact with the needleplates 35, 37 as the substrate passes the tufting heads 20, 22. Associated with the take-up roll 38 is a guide roll 62 and an edge sensing unit 64. The sensor 64 reacts either to a datum mark on the substrate 24 or one of the lateral edges thereof to cause the idler roll 62 and the driven take-up roll 38 to adjust and control the lateral position of the moving substrate 24. This ensures that the rows of tufts inserted by the second tufting head 22 are maintained in accurate lateral spaced relationship to the rows of tufts inserted by the first tufting head 20. This lateral position controlling means 66 comprising the sensor 64, roll 62, and take-up roll 38 can be constructed in accordance with any of the systems known for performing this function, for example he HYDRALIGN (trademark) servo hydraulic edge guide system sold by Hydralign, Inc. of Walpole, Mass. under their catolog No. A.D.C.4685.

The substrate 24 should preferably be controlled widthwise throughout its passage and also be kept flat. It is preferable, therefore, also to incorporate the supply roll 32 in a separate such servo hydraulic guide system with the sensor therefor located upstream of the first tufting head 20.

Figure 3:
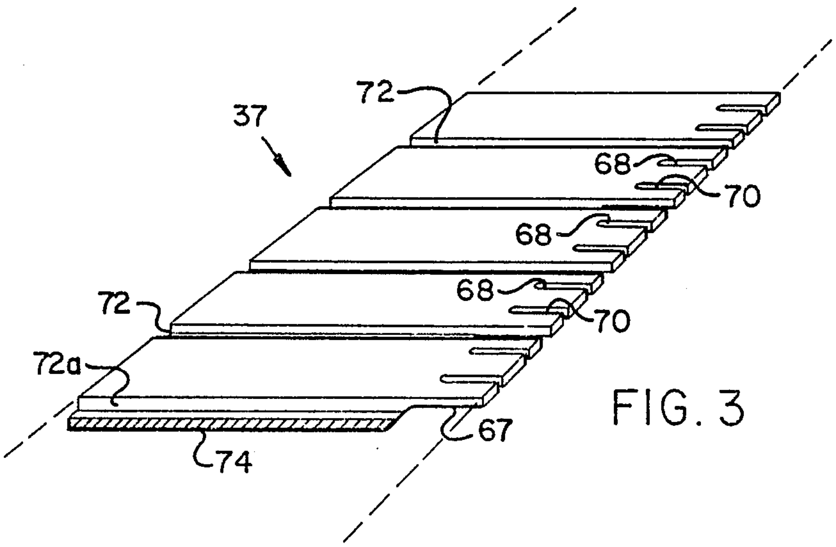
FIG. 3 is a perspective view from above of a portion of the needleplate of the second tufting head in FIG. 2.

FIG. 3 shows in perspective view of a portion of the needleplate 37 of the second tufting head 22. The needleplate 37 is made of steel, extends transversely under the width of the substrate 24, and has slots 68, 70 through its thinner trailing edge 67 for penetration therethrough of the needles of the tufting head 22. The needle plate 37 also has a series of parallel grooves 72 extending from the front to the trailing edges thereof. The sectioned portion of the needleplate 37 shows a wall 72*a* of one of the grooves 72, and the solid metal portion 74 of the plate 37 below the grooves 72. The grooves 72 form slots in the plate's thinner trailing edge 67 as they extend therethrough. As can be seen, the needle slots 68, 70 are disposed in pairs on each side of the grooves 72. This is to enable the grooves 72 to accommodate the rows of tufts inserted by the first tufting head 20 and enable the second tufting head 22 to insert rows of tufts on each side thereof while the substrate is supported by the upper surface of the needle plate 37.

Figure 4:
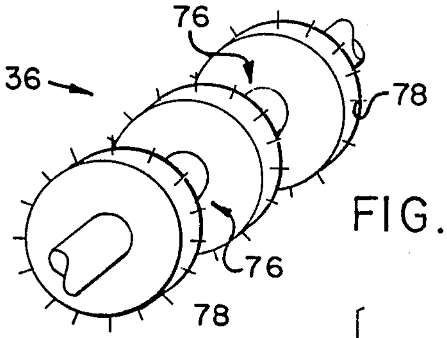
FIG. 4 is a perspective view from above of a portion of the spiked conveying roller located downstream of the second tufting head in FIG. 2.

FIG. 4 illustrates in perspective view annular grooves 76 formed in and equi-spaced along the axis of the spiked roll 36, the substrate engaging spikes 78 of the roll 36 being located on each side of these grooves 76. The annular grooves 76 are of a little greater width than the second needleplate grooves 72, but their centers are spaced apart the same distance as the grooves 72, so that the annular grooves 76 are aligned with the grooves 72. Each annular groove 76 accommodates three adjacent tufted rows and the spikes or pins 78 engage the substrate 24 between these groups of three tufted rows. The roll 62 is preferably also formed the same as the roll 36, but without the spikes 78.

Figure 5A:
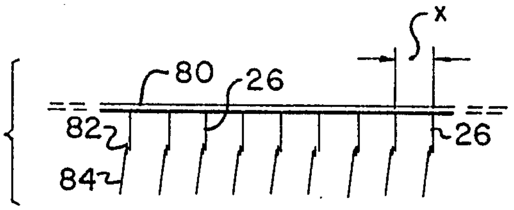
FIG. 5a is a rear elevational view of a portion of the needlebar and associated loopers and cutters of the first tufting head of FIG. 2.

FIG. 5*a* shows a portion of the length of the needlebar 80 which extends transversely across the width of the first tufter head 20. The bar 80 carries a plurality of needles 26 extending downwardly therefrom and equispaced apart a distance x. Each needle during its stitching action cooperates a looper 82 and a cutter 84. The looper and cutter assemblies 82, 84 may be either all left hand or all right hand, and they are shown in FIG. 5*a* as all left hand.

Figure 5B:
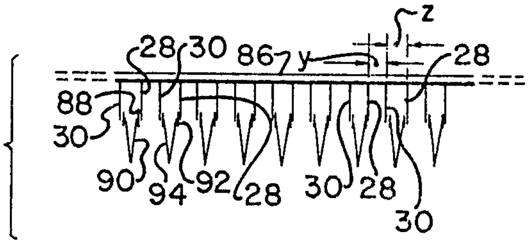
FIG. 5b is a view corresponding to FIG. 5a of a portion of the needle bar with associated loopers and cutters of the second tufting head of FIG. 2.

FIG. 5*b* shows a portion of the length of the needlebar 86 of the second tufting head 22 and carries a plurality of pairs of needles 28, 30, each pair of needles 28, 30 being spaced the same distance y apart. Each pair of needles 28, 30 is spaced a distance y plus z from the next pair of needles 28, 30, that is, there is a distance z between adjacent needles 30 and 28 measured from left to right in FIG. 5*b*. Each needle 28 has a let hand looper 88 and a left hand cutter 90 associated there with, and each needle 30 has a right hand looper 92 and a right hand cutter 94 associated therewith. The pairs of needles 28, 30 are disposed along the needlebar 86 so that they are equispaced on either side of an aligned needle 26 of the needlebar 80. The space y between each pair of needles 28, 30 is left free of loops and cutters so as to enable a tufted row produced by the associated needle 26 of the first needlebar 80 to pass between the pair of needles 28, 30 without interference from loopers or cutters. It will be seen, therefore, that the space z between adjacent pairs of needles 28, 30 accomodates both a right hand looper and cutter assembly 92, 94 and an adjacent left hand looper and cutter assembly 88, 90. The distance z is chosen to be sufficient to accommodate both a left hand and a right hand looper cutter assembly in which the lower ends of the respective cutters 94, 90 converge towards each other. The distance x of needle spacing on the first needlebar 80 and the distance y between pairs of needles 28, 30 on the second needlebar 86 are chosen in relation to the particular weatherstripping product to be produced; for example, the distance x could be 0.2 inches, y 0.062 inches and z 0.138 inches so that the first tufting head 22 would be equivalent to a 1/5th gauge tufter, the spacing of the pairs of needles 28, 30 of the second tufting head 22 would be equivalent to a 1/16th gauge tufter, and the resulting weatherstripping products would be equivalent in gauge to a product tufted on a 32nd gauge tufter.

Figure 6:
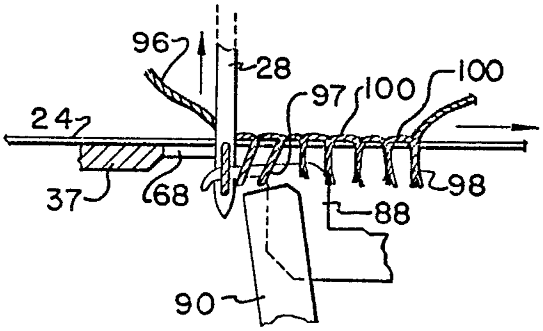
FIG. 6 is a side view, partly in section, showing in greater detail a needle of either needlebar with its associated looper and cutter.

FIG. 6 illustrates in greater deatil a side view of a needle 28 with associated left hand looper 88 and cutter 90 as viewed from the left in FIG. 5*b*. Part of the needleplate 37 is shown supporting the substrate 24 and the needle 28 is shown penetrating one of the slots 68. A yarn 96 is threaded through the eye of the needle 28 and forms pile loops 97 extending downwardly from the substrate 24 as the latter is advanced to the right and the needle 28 reciprocated. The looper 88 is moved in synchronisation with the needle 28 to collect the loops 97 on its upper forwardly projecting end, and the cutter 90 is also moved in synchronisation to cut the loops 97 engaged by the looper 88 to form cut pile tufts 98, as is well known in the tufting art. On the upper side of the substrate 24, between adjacent tufts 98, the yarn 96 forms tuft "knuckles" 100. The right hand looper and cutter assemblies 92, 94 are constructed and operate similarly, but on the other side of their needles 30. Further, the left hand looper and cutter assemblies 82, 84 in FIG. 5*a* are similar to the assembly shown in FIG. 6.

Figure 7:
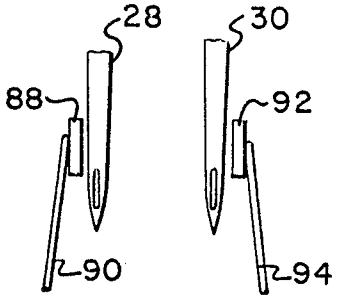
FIG. 7 shows in greater detail an associated pair of needles of the second needlebar of FIG. 5b together with their associated loopers and cutters.

FIG. 7 shows diagrammatically an elevational view, from the downstream side, of one pair of needles 28, 30 of the second tufting head 22 together with the associated left hand and right hand looper and cutter assemblies 88, 90 and 92, 94 respectively.

In operation, the motor drive unit 44 is adjusted for the desired linear throughput speed of the substrate 24, the gear box 46 is adjusted for the desired stitch rate of the first tufting head 20, and the gear box 56 is adjusted for the desired stitch rate of the second tufting head 22. The two tufting heads 20, 22 with their usual associated mechanisms are adjusted for the desired pile height each is to produce, and each is also set up as to whether it is to produce looped or cut pile. As is well known, when producing looped pile another looper assembly is employed in which the loopers point downstream, that is in the opposite direction to the looper 88 in FIG. 6. The tufter is then creeled with the same or different yarns being supplied to the two tufting heads 20, 22 depending upon the product to be made. A suitable supply roll 32 of substrate, preferably non-woven synthetic primary backing, is placed in position and the substrate fed through the apparatus as shown in FIG. 2 onot the take-up roll 38. Thereafter, the motor unit drive 44 is started and as the substrate 24 is fed forwards by the spiked rolls 34, 36, the needles 26 of the first tufting head 20 insert a plurality of spaced apart, parallel tuft rows. These rows pass through the grooves 72 in the needleplate 37 of the second tufting head 22, this enabling the needleplate 37 to contact the underside of the substrate 24 without damage to these tufted rows. As substrate 24 continues past the second tufting head 22, the pairs of needles 28, 30 thereof insert a row of tufts on each side of each row of tufts previously inserted by the first tufting head 20. The sensor 64 continuously senses an outside edge of the substrate 24 and causes the roll 62 and the take-up roll 38 to be displaced laterally as necessary to maintain each row of tufts inserted by a needle 26 of the first tufting head in the center between the two rows of tufts inserted on each side thereof by a pair of needles 28, 30 of the second tufting head. The take-up roll 38 is driven at a peripheral speed equal to that of the linear speed at which the substrate 24 is advanced past the tufting heads, this being accomplished by any of the well known drive mechanisms for this purpose. In FIG. 2 the substrate having the single rows of tufts inserted therein by the first tufting head 20 is indicated by the reference numerals 102, and the substrate having the groups of three adjacent rows tufted therein, one from the first tufting head and two from the second tufting head, is indicated by the reference numerals 104. Subsequently, the full take-up roll 38 of tufted substrate is removed, and a secondary backing or layer applied thereto by any of the secondary backing techniques well known in the industry. Thereafter, the backed, tufted substrate is slit lenghtwise between each group of three tufted rows to produce the final weatherstripping produce. This slitting can be performed by knives, for example, as shown in FIG. 2 of U.S. Pat. No. 4,288,482, but is preferably performed by ultrasonic slitters such as the model F-10 ultrasonic slitters sold by the Branson Sonic Power Company of Danbury, Conn.

The method of producing weatherstripping just described has these advantages. Weatherstripping having three (or two) rows of pile can be produced by tufting with the tufted rows of pile being closer together than has hithertofore been possible with commercially available tufting machines. Also, weatherstripping products can readily be produced which contain all cut pile, or all loop pile, or a combination with one or more rows of pile being looped and the other row or rows being cut. Furthermore, different rows of pile can be made to different density by selecting different stitch rates for the two tufter heads 20, 22 as well as by feeding different denier yarns to the two tufter heads. Another advantage of this process is that the two tufters can be set to produce different pile heights resulting in a weatherstripping product in which one or moee rows of pile can be higher or lower than the other row or rows of pile, and further the rows of higher or lower pile height may be cut or loop pile. It will be appreciated, therefore, that the present invention enables conventional pile weatherstripping products to be advantageously made by tufting, as well as a wide variety of new pile weatherstripping products that hitherto could not have been made commercially.

Figure 8:
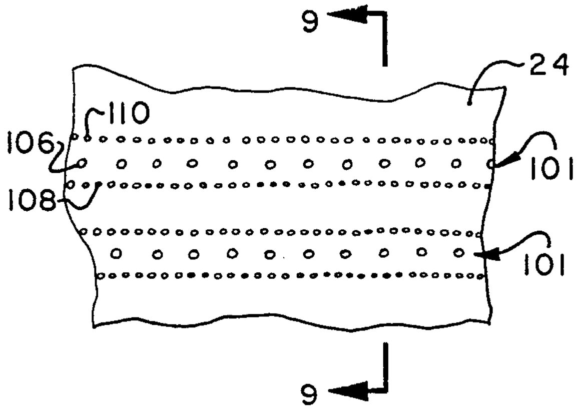
FIG. 8 is a schematic plan view of a fragment of the tufted substrate after leaving the second tufting head.

FIG. 8 illustrates a top view of a portion of the substrate 24 after it has passed the second tufting head 24 and schematically shows two strip portions 101 each containing a center row of tufts 106 and two outside rows of tufts 108, 110. The tufts 106 were inserted by a needle 26 of the first tufting head, and the tufts 108, 110 were inserted by a pair of needles 28, 20, respectively, of the second tufting head. The tufts 106 are illustrated, for the purpose of example, as being of larger diameter and spaced further apart than the tufts in the two outside rows 108, 110. As will be understood, after the substrate has been backed and slit, each of the strip portions 102 forms a separate strip of weatherstripping. Such a product is obtained by having the stitch rate of the second tufting head 22 set at just over twice the stitch rate of the first tufting head 20, and feeding a heavier denier yarn to the first tufting head 20 than to the second tufting head 22.

Figure 9:
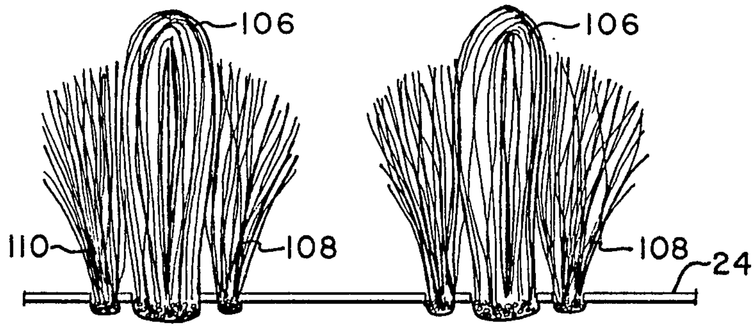
FIG. 9 is a section on the line 9—9 of the fragment of FIG. 8 when inverted through 180°.

FIG. 9 shows on a larger scale a cross-section on the line 9—9 of FIG. 8, but inverted through 180° so the tufts extend upwards, and showing a pair of tufts 110, 108 disposed on each side of a center tuft 106. In this example, the outside tufts 110, 108 have been cut to form cut pile, and the center tuft 106 has not been cut and remains as loop pile. Further, the center row of loop pile 106 has greater pile height than the outer cut pile rows. This provides a weatherstripping product in which the higher center row of loop piles can form a very effective sealing surface against a door or window member being sealed and with low frictional drag when moved relative to the door or window member against which it seals, the shorter side piles 110, 108 helping to support and return the center pile 106 to an upright position.

Figure 10:
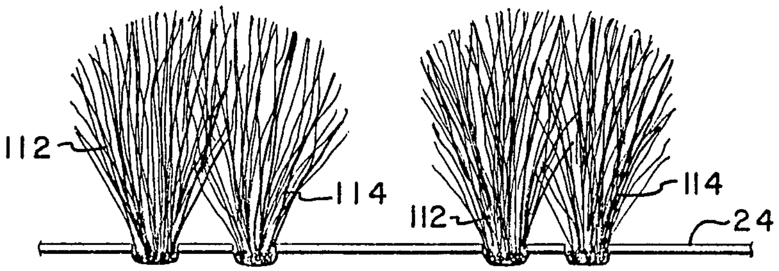
FIG. 10 is a view similar to FIG. 9 of another product according to the invention.

FIG. 10 illustrates another weatherstripping product readily produced by the method and apparatus of the present invention. In this, each strip of weatherstripping will comprise two rows 112, 114 of cut pile. The row of tufts 112 is inserted by a needle 26 of the first tufting head 20, and the adjacent row of tufts 114 is inserted by a needle 28 of the second tufting head 22. The needles 30 of the second tufting head 22 are not threaded with yarn and do not produce a row of tufts in this embodiment. With this product, the two rows of tufts 112, 114 are spaced closer together than could be obtained with conventional tufting techniques; this enables a very narrow pile weatherstripping to be produced by tufting and yet include two rows of pile.

Another embodiment of apparatus and process according to the invention, this being the preferred embodiment, will now be described with reference to FIGS. 11 through 17 with some reference to Figures previously described.

Figure 11:
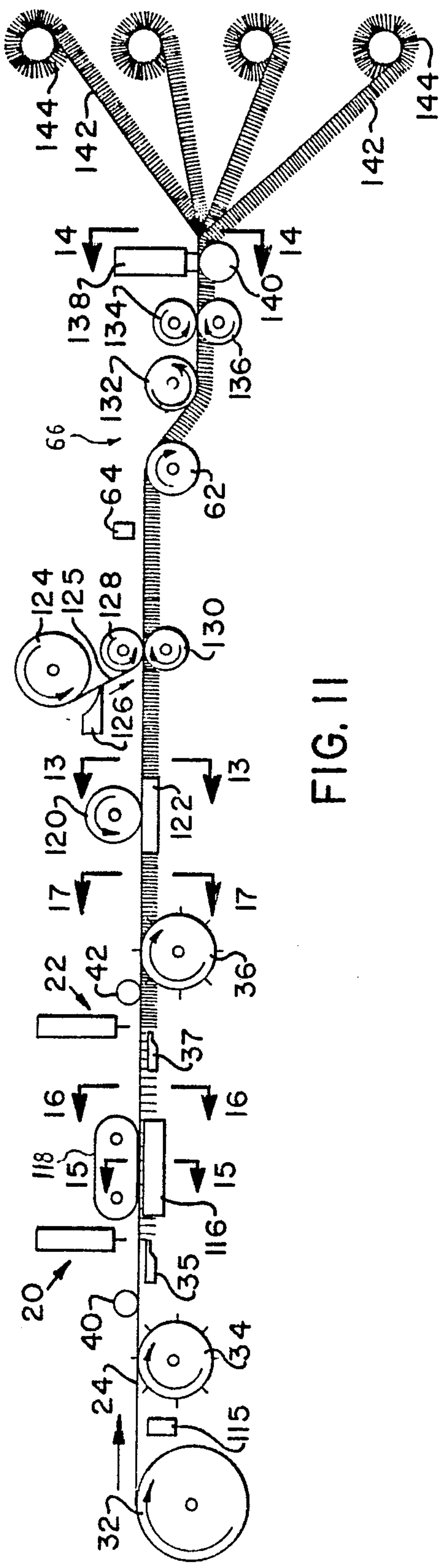
FIG. 11 is a schematic elevational view similar to FIG. 2 of a more elaborate tufting machine according to and for carrying out the invention.

FIG. 11 diagrammatically shows an elevational view of the preferred tufting apparatus according to the invention for producing pile weatherstripping in a complete continuous process. This apparatus includes first and second tufting heads 20, 22, respectively, with associated needleplates 35, 37, respectively, driven spiked rolls 34, 36 with associated idler rolls 40, 42, and a sensor 64 and first roll 62 of a servo edge guidesystem 66, all as shown in and previously described in relation to FIGS. 2 through 7, and only the features in which the apparatus of FIGS. 11 through 14 differs from the tufter of FIGS. 2 through 7 will be described further. Between the supply roll 32 and the first tufting head 20 is located an edge sensor 115 which forms part of another servo edge guide system including the supply roll 32 and the spiked roll 34 for accurately locating the substrate 24 transversely with respect to the first tufting head 20. Between the first and second tufting heads 20, 22, and disposed below the substrate 24, is a heated die assembly 116 which extends transversely across the width of the substrate for heat processing the rows of tufts inserted by the first tufting head 20, as will be described in greater detail later. An endless belt 118, extending transversely across the width of the substrate, holds the substrate 24 down as the previously tufted rows pass through the die assembly 116. Downstream of the second tufting head 22 and the spiked 36 is disposed a knuckle deforming means comprising a driven grooved roller 120 arranged to press the substrate 24 downwards against a grooved support plate 122 disposed below the substrate. Downstream from the knuckle deforming means 120, 122, a supply roll 124 of secondary backing is freely mounted for rotation at a distance above the substrate 24. Secondary backing 125 is drawn from the supply roll 124, over an adhesive applicator 126, downwards between a pair of driven pressure rolls 128, 130, the pressure support roll 130 below the substrate 24 being grooved simiarly to the rolls 36 and 62 to accommodate the series of tufted rows without damage thereto. The edge guiding system 66 is modified by the previous take-up roll 38 being replaced by a smoothed surfaced roll 132 of equal diameter to the roll 62 and driven at the same speed thereas but in the opposite direction of rotation. Thereafter, the combined secondary backing 125 and substrate 24 pass between a pair of rolls 134, 136 (the underneath roll 136 being grooved), through a slitting station comprising an upper ultrasonic horn assembly 138 and a lower anvil assembly 140, and then the slit separate strips 142 of weatherstripping are individually wound on a plurality of take-up spools 144.

Figure 12:
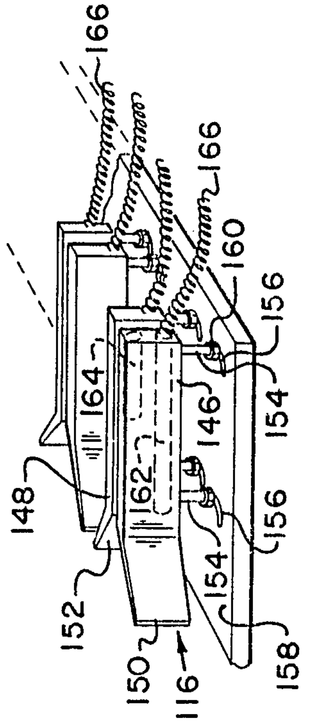
FIG. 12 is a perspective view from above of a portion of a heated die station in the tufter of FIG. 11.

FIG. 12 shows a perspective view from above of a portion of the heated die assembly 116. Pairs of metal dies 146, 148 having generally parallel body portions and divergent lead-in entry portions 150, 152, respectively, are mounted on pairs of support rods 154 which engage through arcuate grooves 156 in a mounting plate 158 which extends transversely across the width of the tufting machine. Each rod 154 is secured in position in its respective arcuate slot 156 by nuts 160 screw threaded on the rod and engaging opposite faces of the mounting plate 158. The arcuate slots 156 and the adjustable nuts 160 enable the spacing between the pair of dies 146, 148 to be adjusted. Each die 146 and 148 has inserted in bores therein a cartridge heating element 162 and a thermostat 164 for controlling the latter, both shown in broken lines, with power being supplied thereto through a supply lead 166. The thermostats 164 are adjustable for adjusting the temperature to which the pairs of dies 146, 148 are heated.

Figure 13:
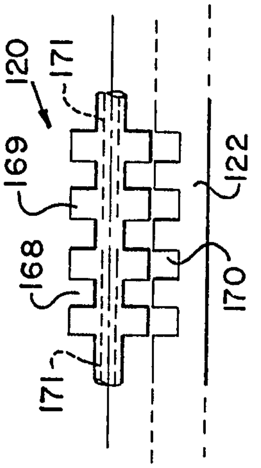
FIG. 13 is a view taken on the line 13—13 of FIG. 11 of a portion of a "knuckle" deforming station.

FIG. 13 shows an elevational view of a portion of the knuckle deforming roller 120 and associated support plate 122 viewed in the upstream direction from the rollers 128, 130 towards the second tufting head 22. The roller 120 has a plurality of axially spaced apart annular grooves 168 therein defining a plurality of equi-spaced apart disks 169. The support plate 122 has a plurality of parallel grooves 170 across the upper surface thereof in a direction parallel to the direction of advancement of the substrate 24. The grooves 170 are disposed beneath and in alignment with the disks 169, the disks 169 preferably being slightly narrower than and above the grooves 170. There is a small clearance between the periphery of the disks 169 and the upper surface of the plate 122, preferably this is adjustable. A pair of cartridge heating elements 171 extend from opposite ends in a bore through the center of the roller 120. The roller 120 is drivne by the motor drive unit 44 (shown in FIG. 2, but omitted for simplicity from FIG. 11) in the direction of feed of the substrate 24 but at a peripheral speed less than the speed of feed of the substrate 24, for example 5% to 20% less. The axial width of the disks 169 is approximately equal to the width of each series 101 of the three tufted rows 106, 108, and 110 of tuft knuckles (see FIG. 8).

Figure 14:
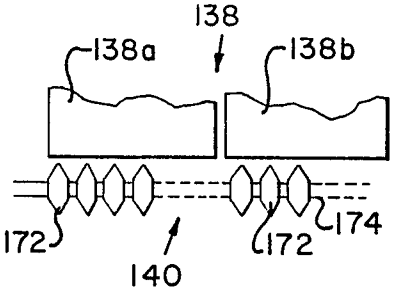
FIG. 14 is a view taken on the line 14—14 of FIG. 11 illustrating a cutting station.

FIG. 14 is an elevational view on the line 14—14 in FIG. 11 of portion of the horn and anvil slitting station 138, 140. The horn and anvil assemblies are similar to those previously referred to and supplied by Branson Sonic Power Company, except instead of having individual horns for each cutting position, two rather long horns 138*a*, 138*b* are disposed transversely across the full width of the substrate. Also, although each cutting position has associated therebelow a stationary circular disk anvil 172, all the anvils 172 are mounted on a common shaft 174 which is normally fixed but can be adjustably rotated to enable worn surface portions of the anvils 172 to be replaced opposite the horns 138*a* and 138*b* by unused portions of the disk anvils 172. With this ultrasonic slitter, a slit will be made through the combined secondary backing 125 and substrate 24 at a location above each disk anvil 172.

In operation the tufting heads 20 and 22 are individually adjusted as with the previous embodiment as to stitch rate, pile height, and cut or looped pile, and a supply roll 32 of substrate is loaded in position and the substrate 24 then fed through the length of the apparatus. The rows of tufts produced by the first tufting head 20 pass through the pairs of heated dies 146, 148 of the heated die assembly 116 to heat treat these center pile rows. Preferably, the degree of compression the pairs of dies exert on these rows and the temperature of the dies is selected so that these center pile rows are transformed into film-like center barrier fins as will be described more fully later. These center barrier fins then pass through the grooves 72 in the needleplate 37 as the second tufting head 22 inserts a row of tufts on each side of every fin. The product so formed then passes between the heated knuckle deforming roller 120 and the support plate 122 with the groups of tufted rows passing through the grooves 170. The heat and pressure of the disks 169 on the tuft knuckles (see 100 in FIG. 6) soften and spread these rows of knuckles into a thin ribbon spread onto and adhering to the upper surface of the substrate 24. This knuckle deforming action is greatly enhanced by the smearing action effected by the roller 120 being rotated at a peripheral speed less than the speed at which the substrate 24 is being forwarded. During this step, the three rows of knuckles of the three rows of tufts comprising a single product section 101 (see FIG. 8) are together deformed into a single ribbon. Then, the secondary backing 125 with adhesive spread thereon is applied to the upper surface of the substrate 24 (and knuckle deformed ribbons) by the roller 128 and secured fimrly in position by the pressure between the roller 128 and the grooved roller 130. The combined secondary backing 125 and substrate 24 are then conveyed sufficient distance to enable the adhesive to set, preferably a low temperature or cold setting adhesive being employed. Then the product passes through the servo guide system 66 which continually adjusts the lateral position of the substrate 24 and secondary backing 125 to both keep the tufted rows produced by the first tufting head 20 in correct alignment between the tufting rows inserted by the second tufting head 22, and to keep the composite sections of tufted rows 101 correctly aligned between the anvil disks 172 of the slitting station 138, 140. The individual strips of weatherstripping 142 produced by this slitting operation are then individually taken up on a plurality of take-up spools 144. The weatherstripping on these spools is then ready for packing, shipment and use.

It has been found that the action of slitting with the ultrasonic slitters creates a type of weld along each slit edge, this weld-like formation firmly securing the edges of the secondary backing 125 to the edges of the substrate 24. Consequently, it is not necessary for the secondary backing 125 to be strongly adhered by adhesive to the substrate, and this enables low or even cold setting adhesives to be applied by the adhesive applicator 126 which otherwise would possibly not give a sufficiently laminate bond between the secondary backing and the substrate 24.

Figure 15:
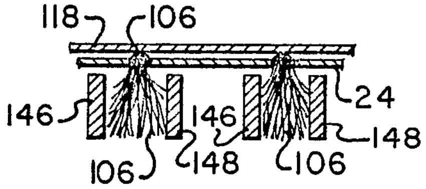
FIG. 15 is a section on the line 15—15 of FIG. 11.
Figure 16:
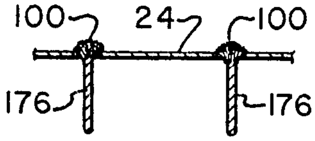
FIG. 16 is a section on the line 16—16 of FIG. 11.
Figure 17:
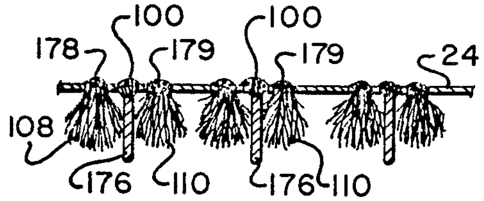
FIG. 17 is a section on the line 17—17 of FIG. 11.

FIGS. 15 to 17 illustrate the formation of a filmlike barrier fin from the center row of tufts 106 (see FIGS. 8 and 9) inserted by the first tufting head 20.

FIG. 15 is a section on the line 15—15 of FIG. 11 and shows the center row of tufts 106, before the outside rows of tufts are inserted, passing between the pairs of heated dies 146, 148. The lower flight of the endless belt 118 can be seen pressing down on the knuckles 100 of the tufts, to hold the substrate 24 down against any reaction of the pairs of dies 146, 148 on the center rows of tufts 106 that might otherwise cause the rows 106 to rise up between pairs of dies. Each pair of dies 146, 148 is set a small distance apart, for example between 0.030 and 0.005 inches in order to compress the row of tufts 106 being drawn therebetween. In FIG. 15 the distance between the pair of dies 146, 148 has been greatly exaggerated for clarity. The temperature of the dies 146, 148 and the degree of compression or pressure they assert upon the center row of tufts 106 is chosen depending upon the material of the tufts 106 and the type of barrier fin to be formed. The outwardly flared leading portions 150, 152 (see FIG. 12) of the dies 146, 148 enable the rows of tufts to enter and be guided between the dies and progressively compressed thereby before reaching the parallel portions of the main bodies of the dies where final compression occurs for a time sufficient for adequate heat transfer from the heat dies to the rows of tufts passing therebetween. When high compression is needed, it may be preferable to arrange the parallel portions of the dies to progressively converge.

FIG. 16 is a fragmentary section on the line 16—16 of FIG. 11 and shows the center rows of tufts having been transformed into film-like barrier fins 176 after passing between the pairs of heated dies. To obtain the complete conversion of the fibers of the tufts into a continuous film, the heated dies 146, 148 are set to effect a medium to high pressure upon the tufts 106, and the temperature of the dies is set a little below the melting point of the fibers of the tufts 106. The fibers of the tufts are converted wholly, or partially, into a film by a combination of the temperature of the dies, the degree of compression effected by the dies, the length of time the row of tufts is in contact with the dies, and the smearing action created by the relative movement of the fibers over the stationary dies as the material of the fibers is softened. The center row of tufts 106 may be left uncut, i.e. as looped pile as shown in FIG. 9, or may be cut and in the form of cut pile similar to the outside rows 108, 110 shown in FIG. 9. For example, if the center row of tufts is made from 2,500 denier texturized multifilament polypropylene yarn with 20 stitches per inch, the pairs of dies 146, 148 should be set approximately 0.020 inches apart and heated to a temperature in the range of 300° to 315° F. To obtain a center barrier fin in which the center of the fin is still in the form of indivudual fibers with each side of the fin being formed as a skin-like film, the heated dies would be set slightly further apart to reduce the degree of compression on the row of tufts, and the temperature would be set lower.

FIG. 17 is a fragmentary section on the line 17—17 of FIG. 11 and shows the pairs of outside rows of tufts 108, 110 disposed closely adjacent each side of each barrier fin 176 after the substrate 24 has passed the second tufting head 22. If the rows of tufts 108, 110 inserted by the second tufting head have a lower pile height than the center row of tufts inserted by the first tufting head 20, then the barrier fins 176 will extend above the tops of the outside rows of tufts, as shown in FIG. 17. On the other hand, if it is desired that the barrier fins 176 should be equal in height to the outside rows of tufts, or even less in height, then the pile height of the first tufting head 20 is adjusted accordingly. To obtain a more uniform finish to the free edges (i.e. the lower edges in FIG. 17) of the barrier fins 176, one of each pair of dies 146, 148 may be modified to have an inwardly extending lip along the bottom edge thereof to form a definite floor to the space between the pairs of dies 146, 148, this floor contacting and smoothing the lower edge of the barrier fin 176 as it is formed. The knuckles 100 (see also FIG. 6) of the center row of piles can be seen in FIG. 17, together with the knuckles 178, 179 of the outside rows of pile.

Figure 18:
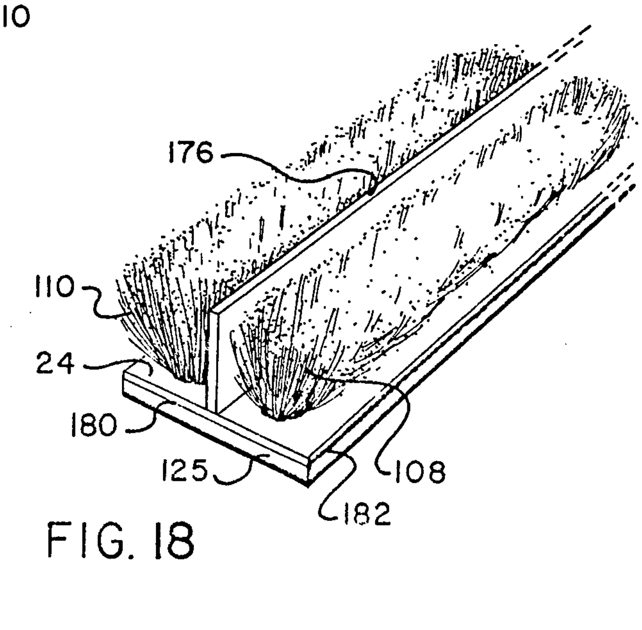
FIG. 18 shows a perspective view of weatherstripping made by the apparatus of FIG. 11.

FIG. 18 shows a perspective view of an example of finished weatherstripping, in the form it is wound on the take-up spools 144. It comprises the film-like center barrier fin 176 extending above a pair of bushy outside pile rows 110, 108, the base of the weatherstripping being formed by the substrate 24 laminated by a layer of adhesive 180 to the secondary backing 125. The outer edges of the substrate 24 and secondary backing 125 are welded together at 182 along the length thereof by the action of the ultrasonic slitters 138, 140. In use, the weatherstripping, as is well known, is attached to an edge of a door or window, or the stationary frame thereof, by the base 24, 125 being inserted in a lipped groove. Typically, the width of the base of such weatherstripping varies between 0.19 inches to 0.50 inches (4.8 mm to 12.7 mm), the flange thickness of the base varies from about 0.04 inches to 0.08 inches (1 to 2 mm) and the pile height varies from about ⅛ inch to ½ inch (3 mm to 13 mm).

Specific examples to illustrate how the present invention can be carried out will now be described.

EXAMPLE 1

Using 12 inch wide tufting heads in the apparatus of FIG. 11, and setting the two tufting heads 20 and 22 twenty-four inches apart, the first tufting head 20 should be creeled with 2,500 denier multi-filament conjugate yarn in which each filament has a polypropylene core surrounded by a polyethylene sheath, such as supplied by Imperial Chemical Industries, Harrogate, England, under the trademark Heterofil, and the second tufting head 22 should be creeled with 1050/70 denier texturized multi-filament polypropylene yarn having U.V. stabilisation and a silicone additive, such as supplied by Phillips Fiber Corporation of Greenville, S.C. The substrate 24 should be non-woven polypropylene TYPAR (trademark) having a thickness of 0.017 inches, the secondary backing 125 should be sheet polypropylene having a thickness of 0.015 inches, and the adhesive to be applied by the applicator 126 should be hot melt or rubber based contact adhesive. The first tufting head 20 should have the needles spaced 0.2 inches apart, should be set for a stitch rate of 20 stitches per inch, a pile height of 0.195 inches, and for the cutters 84 to produce cut pile. The second tufting head 22 should have its pairs of needles spaced 0.0625 inches apart, be set for a stitch rate of 10 stitches per inch, a pile height of 0.16 inches, and the cutters 90, 94 set to produce cut pile. The pairs of dies 146, 148 should be heated to a temperature in the range 250° F. to 300° F., for example 280° F., and the distance between each pair of dies adjusted to about 0.025 inches to apply a medium to high pressure to the outer sides of the center pile row. The knuckle deforming roller 120 should be set of at temperature of 225° F. and rotated at a peripheral speed of 20% slower than the linear speed of advancement of the 24. As the substrate 24 is advanced through the machine, center rows of cut pile are inserted by the first tufting head 20, and then these center rows converted to film-like barrier fins by the heated die assembly 116. The temperature of the heated dies has been selected so that the polyethylene of the conjugate yarns is caused to melt and form a film which totally embodies the polypropylene cores. the latter retaining their integrity as fibers so that a fiber reinforced film is formed as the barrier fin. This barrier fin is securely attached to the substrate 24 by the conjugate fibers at its base passing as fibers through the substrate 24 and being connected to the fibers of adjacent tufts by the knuckles on the reverse side of the substrate. On passing the knuckle deforming roll 120, the thermoplastic material of all the knuckles is softened and semared as thin ribbons on the reverse side of the substrate, these ribbons adhering to the substrate and securely locking the central barrier fin and outside rows of tufts thereto. The secondary backing 125 is then laminated to the substrate and flattened knuckles, and then the individual strips of weatherstripping 142 ultrasonically slit from the 12 inch width of tufted and backed substrate 24 to form 60 strips 142 of weatherstripping each having a width of the base of 0.2 inches.

EXAMPLE 2

Using a two headed tufting machine similar to that in FIG. 11 with each head 12 inches wide and with the heads separated longitudinally by 12 inches, the first tufting head should be fitted with a plurality of needles arranged on 0.27 inch centers. The second tufting head should be fitted with tufting needles arranged in pairs with the needles in each pair separated by 0.10 inches and aligned so that the mid-point of the distance between each pair of needles is exactly aligned with the needles in the first needle bar. The needles of the first needle bar should be threaded with two ends of a 1050/70 continuous filament polypropylene yarn such as supplied by Phillips Fibers Co. The stitch rate of this needle bar should be set at 18 stitches per inch and the loopers and cutting bars arranged to produce cut pile 0.25 inches high. The needles of the second needle bar are threaded with one end of the same 1050/70 polypropylene yarn as used in the first needle bar, and the loopers and cutting bars arranged to produce cut pile 0.22 inches high. The stitch rate should be set at 20 stitches per inch. A spunbonded polypropylene nonwoven produced by DuPont under the trademark TYPAR, heat set at 275° F. and weighing 4.2 ounces per square yard, should be used as the primary backing. The primary backing is packaged on a beam and controlled by a series of sensors and forwarding devices so that it is presented and advanced through the tufting and slitting areas in a uniform flat and precise manner. Between tufting and slitting, the tufted fabric is supported on a grooved table for "knuckle" deformation and addition of tuft locking and stiffening material. The "knuckles" are flattened using an oil heated grooved roll. Additional tuft backing and stiffening is provided by spreading a 0.001 inch coating of a hot melt adhesive made by the Bostik Corporation. After cooling the hot melt adhesive by passing it through an air cooled oven, the composite should be trimmed and slit into 44 linear weatherstrips each 0.27 inch wide.

The linear weatherstrips thus produced each consist of three rows of cut fiber piles with the center row having a total fiber denier of 75,600 per inch of length and the two outside pile rows having 42,000 total fiber denier per inch. The center pile row will have a pile height of 0.25 inches and the two outside pile rows a pile height of 0.22 inches. The weatherstrip thus produced would fit into a slot having a slot width of 0.31 inches, a lip opening 0.18 inches and a lip height or slot height of 0.50 inches.

EXAMPLE 3

The process and equipment should be the same as in Example 2 except that the cutting bars and loopers are removed from the needles in the first needle bar and replaced by loop pile loopers. This results in weatherstripping having a center row of loop pile construction 0.25 inches high and two outside pile rows having cut piles with heights of 0.22 inches.

EXAMPLE 4

An apparatus should be constructed with three independently driven tufting heads spaced apart in series with each head 12 inches wide and having a needle bar with the needles spaced apart by 0.187 inches. The tufting heads are spaced 12 inches apart so that the primary backing passes successively through the three heads. Each tufting head is fitted with loopers and cutting bars arranged on the right hand side of each needle. The needle bars are arranged so that the needles in the second bar are aligned 0.04 inches to the right of the needles in the first bar. Similarly, the needles in the third needle bar are aligned 0.04 inches to the right of the needles in the second needle bar. All of the needles are threaded with one end of 1050/70 polypropylene yarn. The first needle bar is adjusted to give a cut pile height of 0.18 inches at a stitch rate of 16 stitches per inch. The second needle bar is adjusted to give a cut pile height of 0.21 inches and a stitch rate of 20 stitches per inch. The third tufting head is adjusted to give a pile height of 0.18 inches at a stitch rate of 16 stitches per inch. A polypropylene spunbonded non-woven primary backing as in Example 2 should be fed to the tufting areas under carefully controlled and monitored conditions. The tufting apparatus should be fitted with sensors and forwarding equipment to ensure that a controlled edge of the primary backing, which is 14 inches wide, does not vary transversely by more than 0.003 inches, and that the primary backing is perfectly flat. The primary backing should be supporting by a supporting table before the first tufting head and by grooved tables thereafter in which the grooves are 0.100 inches wide, the centers of the grooves aligning with the needles in the second tufting head. An oil heated disc roll 8 inches in diameter should be located 16 inches from the last, i.e. third, tufting head. The discs of this roll are 0.100 inches wide and are located over the grooves in the supporting table, the latter grooves being 0.300 inches deep. The heated disc roll is adjusted so that there is a clearance of 0.004 inches above the primary backing. The disc roll is heated to a temperature of 300° F. and is rotated in the direction of travel of the primary backing at a peripheral speed 15% less that the speed of the primary backing. The secondary backing material should be wound on a large beam and consist of light weight polypropylene spunbonded fabric weighting 0.75 ounces per square yard and which has been extrusion coated with 0.006 inches of polypropylene resin. The spunbonded side of this coated fabric is coated with 0.006 inches of a hot melt adhesive manufactured by the Bostick Corporation. This adhesive caoted composite fabric, which is 13 inches wide, is laminated to the tufted fabric after removal of the "knuckles" by the heated disc roll. The laminated fabric is cooled as it moves through a 10 feet air cooled over, and is then slit into individual linear weatherstrips by a series of ultrasonic slitters. The linear weatherstrips thus produced will have three rows of cut piles in which the fiber denier of the outside piles is 33,600 denier per inch with a pile height of 0.18 inches, and the center pile has a denier of 42,000 linear per inch and a pile height of 0.21 inches. The pile weatherstrip so produced will fit into a slot with a width of 0.23 inches, a lip opening of 0.125 inches and slot height of 0.50 inches.

To obtain precise spacing of the rows of tufts and to obtain accurate slitting of the individual weatherstrips, as is desirable in a high quality close toleranced product, the substrate may require precise widthwise, i.e. lateral, guiding throughout its path from the supply roll to the take-up roll or rolls. In the embodiment of FIG. 11 two servo edge guide systems are employed to achieve this. Further edge guiding systems can be incorporated if desired, provided consecutive edge guiding systems are spaced apart lengthwise along the substrate sufficient distance to minimise hunting of these systems and to minimise distortion of the substrate from a flat plane.

To aid in the accurate control of the substrate the tufting heads can be arranged to tuft out of synchronisation. In the case of two tufting heads, the needles of one can be penetrating the substrate while the needles of the other are withdrawn from the substrate, for example the two needle bars can be arranged to reciprocate 180 degrees out of phase. In the case of three spaced apart tufting heads, each needle bar can reciprocate 120 degrees out of phase with the other two, each needle bar being 120 degrees in advance of one of the other bars and 120 degrees behind the remaining bar. In this way the substrate is always being held against lateral distortion by the needles of at least one of the tufting heads.

It will be appreciated that the present invention provides a machine and a process for conveniently manufacturing pile weatherstripping by tufting, and the process is readily adaptable to enable many types and specifications of weatherstripping to be made with the same machine. Further, the present invention enables weatherstripping to be manufactured as a continuous process from substrate supply to finished weatherstripping product using new tufting techniques.

The above described embodiments, of course, are not to be construed as limiting the breadth of the present invention. Modifications, and other alternative constructions, will be apparent which are within the spirit and scope of the invention as defined in the appended claims.

For example, the machine can be designed to produce a single strip of weatherstripping with the first tufting head having only a single needle and the second tufting head having a pair of needles, as illustrated in FIG. 1, as opposed to each tufting head having a plurality of needles as illustrated in FIGS. 5a and 5b. Further, the position of the tufting heads 20 and 22 can be interchanged, i.e., the first tufting head (now 22) can be arranged to insert the outside pairs of rows of tufts and the second tufting head (now 20) can be arranged to insert the center row of tufts between each pair of already inserted outside rows. Also, the tufting head 22, whether in the first or second position, for inserting the outside rows of tufts can have the pairs of needles 28, 30 staggered a short distance across the depth of the needlebar 86 in the direction of travel of the substrate 24; for example, all the needles 28 could be aligned transversely and be positioned one inch upstream of the needles 30 which would also be aligned transversely. This would enable the looper and cutter assemblies 88, 90, and 92, 94 to be staggered slightly in the direction of travel of the substrate to leave more room for the operating mechanism of adjacent converging cutters 94, 90.

What is claimed is:

1. A method of manufacturing weatherstripping, comprising the steps of:

withdrawing primary backing from a supply of a length thereof and moving the withdrawn primary backing longitudinally and continouusly to a location downstream of said supply;

tufting a first row of tufts into said primary backing as it passes a first tufting station between said supply and said location;

tufting second and third rows of tufts into said primary backing as it passes a second tufting station located between said first tufting station and said location;

said second and third rows being tufted into said primary backing immediately adjacent said first row and on each side thereof;

sensing any lateral displacement of said moving primary backing relative to a direction of movement of said primary backing while moving from said supply to the said location; and adjusting said primary backing laterally with respect to said direction in response to said sensing to locate said first row of tufts centrally between said second and third rows of tufts.

2. The method of claim 1, wherein the tufts of said second and third rows are cut at said second tufting station to transform said second and third rows of tufts to cut pile.

3. The method of claim 1, further comprising the step of converting said first row of tufts into a film before the tufting of said second and third rows of tufts.

4. The method of claim 3, wherein said converting step is performed by applying a pair of heated dies against opposite sides of said first row of tufts, said dies being pressed against said first row of tufts as said moving of the withdrawn primary backing moves said first row of tufts between and relative to said dies.

5. The method of claim 4, further comprising the step of flattening the knuckles of the tufts of said first, second and third rows at a knuckle flattening station between said second tufting station and said location by subjecting said knuckles to heat and pressure and smearing the knuckles onto said primary backing as the latter moves past said knuckle flattening station.

6. Tufting apparatus for producing weatherstripping, comprising:

a first tufting head having at least one needle;

a second tufting head having at least one pair of needles; said first and second tufting heads being spaced apart in a longitudinal direction with said one needle being aligned between said pair of needles;

means for moving primary backing in said longitudinal direction past said tufting heads sequentially;

means for sensing the position of the primary backing laterally with respect to said longitudinal direction; and means, responsive to said sensing means, for laterally adjusting the primary backing with respect to said longitudinal direction for positioning a row of tufts inserted in the primary backing by said one needle centrally between a pair of rows of tufts inserted in said primary backing by said pair of needles.

7. The turfingitn apparatus of claim 6, further comprising:

a drive arrangement drivingly connected to both said tufting heads for operation thereof to reciprocate said one needle and said one pair of needles; and means, included in said drive arrangement, for adjusting the rate of reciprocation of said one needle relative to the rate of reciprocation of said one pair of needles.

8. Tufting apparatus for producing weatherstripping, comprising:

a first tufting head having at least one needle;

a second tufting head having at least one pair of needles, said second tufting head being located downstream from said first tufting head;

said first and second tufting heads being spaced apart in a longitudinal direction with said one needle being aligned between said pair of needles;

means for moving primary backing in said longitudinal direction past said tufting heads sequentially, said moving means comprising two spiked rolls spaced apart upstream and downstream, respectively, of said two tufting heads with respect to movement of the primary backing past said tufting heads;

means located between said tufting heads, for heating and compressing a row of tufts inserted in the primary backing by said one needle for converting said row into a film;

a needlplate associated with said second tufting head and through which said one pair of needles reciprocate, said needleplate having a groove therein extending in said longitudinal direction and between said one pair of needles to accommodate said film;

means, located downstream of said second tufting head, for flattening knuckles of the tufts of said row of tufts and of a pair of rows of tufts inserted in the primary backing by said one pair of needles;

means, located downstream of said flattening means, for slitting the primary backing;

means, located downstream of said slitting means, for winding up a roll of the slit primary backing;

means, disposed downstream of said second tufting head, for sensing the position of the primary backing laterally with respect to said longitudinal direction;

means, responsive to said sensing means, for adjusting the primary backing laterally with respect to said longitudinal direction for aligning said film between said pair of rows of tufts; and means for adjusting the stitch rate of said second tufting head relative to the stitch rate of said first tufting head.

* * * * *